US012642267B1

(12) United States Patent
Hui et al.

(10) Patent No.: US 12,642,267 B1
(45) Date of Patent: Jun. 2, 2026

(54) SYSTEM AND METHOD FOR MITIGATING RED PALM WEEVIL INFESTATIONS IN A PALM TREE

(71) Applicant: Prince Mohammad Bin Fahd University, Dhahran (SA)

(72) Inventors: Kwan San Hui, Norwich (GB);
Abdullah A. Alhamdan, Dhahran (SA);
Esam Jassim, Dhahran (SA);
Faramarz Djavanroodi, Dhahran (SA);
Mushtaq Khan, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 19/372,383

(22) Filed: Oct. 29, 2025

(51) Int. Cl.
A01M 29/18 (2011.01)

(52) U.S. Cl.
CPC .................................. A01M 29/18 (2013.01)

(58) Field of Classification Search
CPC .................................................... A01M 29/18
See application file for complete search history.

(56) References Cited

U.S. PATENT DOCUMENTS

2023/0160743 A1* 5/2023 Ashry .................... G06N 3/045
73/655

FOREIGN PATENT DOCUMENTS

| | | | | |
|---|---|---|---|---|
| CN | 214758830 U | 11/2021 | | |
| IN | 202141045880 A | 4/2023 | | |
| WO | WO-2022229001 A1 * | 11/2022 | ............ | A01M 1/026 |

OTHER PUBLICATIONS

Md. Akkas Ali, et al., "Multi-Features and Multi-Deep Learning Networks to identify, prevent and control pests in tremendous farm elds combining IoT and pests sound analysis", Research Square, Apr. 23, 2024, Preprint (version 1), 36 pages.
Safa Yaghi, et al., "Red palm weevil treatment robot"; 2023 2nd International Engineering Conference on Electrical, Energy, and Artificial Intelligence (EICEEAI), Zarqa, Jordan, 2023, 6 pages with Abstract.

* cited by examiner

*Primary Examiner* — Richard G Davis
(74) *Attorney, Agent, or Firm* — Oblon, McClelland, Maier & Neustadt, L.L.P.

(57) ABSTRACT

A device and method for mitigating red palm weevil infestations in palm trees through coordinated ultrasonic disruption. The device includes a solar-powered system including a battery, charger, dimmer, and ultrasonic wave generator to produce acoustic emissions in a frequency range of 20 kHz to 100 kHz. A dual-emitter configuration includes one or more internal emitters, each having a rigid cylindrical probe with a compact, wide transducer tip adapted for insertion into the tree trunk, and at least one pair of external emitters arranged on opposing sides of the trunk using flexible semicircular brackets. The emitters operate in synchronized coordination via the dimmer to direct ultrasonic waves toward overlapping tissue zones, thereby generating constructive interference. A digital display indicates frequency level and battery status. The method includes synchronized ultrasonic wave transmission for disrupting insect movement, orientation, communication, and reproduction within plant structures.

20 Claims, 12 Drawing Sheets

402

506

502

504

508

606 602 604

1002

1004

1006

1104

Cutoff
55 °C

1102

1202

1204

1302

Controller

Waveform Modulation
(Pulsed Mode)

1304

Ultrasound

1306

Feedback Loop

1308

Tissue Impedance /
Temperature Data

SYSTEM AND METHOD FOR MITIGATING RED PALM WEEVIL INFESTATIONS IN A PALM TREE

BACKGROUND

Technical Field

The present disclosure relates to a system and method for mitigating infestations using ultrasound-based disruption. More specifically, the present disclosure pertains to an autonomous, solar-powered, frequency-adjustable ultrasonic pest control system adapted for application in palm trees.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Red palm weevil (RPW) infestation represents a pervasive challenge in agricultural and ecological domains, particularly in regions where palm trees constitute significant economic or cultural value. The larvae of the RPW bore into the trunks of palm trees, where they remain concealed while consuming internal tissue. This tunneling behavior weakens structural integrity, impairs nutrient transport, and ultimately results in tree mortality. The economic implications are profound, affecting both plantation-scale production of coconut, date, and oil palms, as well as landscaped and heritage palm specimens in urban and semi-urban environments.

Traditional approaches to red palm weevil control have relied heavily on chemical insecticides, pheromone-based lures, manual tree inspection, and biological control agents. However, these methods are often limited in efficacy due to the concealed nature of larval infestation, the rapid reproduction cycles of the weevils, and the environmental consequences of persistent chemical application. Moreover, existing methods generally lack adaptability to changing infestation dynamics and are often resource-intensive to implement at scale.

Recent efforts have explored acoustic and ultrasonic technologies for detection and control of RPW populations. WO2022229001A1 discloses a system for early stage detection of RPW larvae by stimulating larval motion using a narrowband acoustic excitation signal and monitoring the vibrational response via motion sensors embedded in a probe.

CN214758830U describes an ultrasonic pest repelling device adapted for use in grapevines. The system includes a controller, ultrasonic generator, and remote control module for adjusting signal frequencies.

IN202141045880A presents a non-invasive plant wearable system for RPW detection, utilizing an accelerometer sensor and digital signal processor to detect vibrational patterns associated with larval activity. This disclosure emphasizes early identification and remote monitoring through wireless networks.

Additionally, research published by Akkas et al. explores multi-feature deep learning networks and IoT-based modules for pest sound analysis, including systems incorporating programmable ultrasound generators and solar-powered energy systems.

Each of the aforementioned references are constrained by limitations in adaptability, energy autonomy, and pest-specific targeting capabilities. Existing technologies fail to deliver an integrated solution capable of emitting dynamically tunable ultrasonic frequencies spanning 20 kHz to 100 kHz for the purpose of disrupting red palm weevil locomotion, communication, and reproductive behavior. Furthermore, prior systems do not permit real-time adjustment of operational frequency parameters in response to infestation severity or species-specific responsiveness, nor do they enable sustained operation through a self-contained renewable energy source.

Accordingly, there remains a need for a field-deployable, non-toxic, and environmentally sustainable system configured to actively interfere with red palm weevil activity using programmable ultrasonic waveforms.

SUMMARY

In an exemplary embodiment, a device for mitigating red palm weevil infestations in a palm tree is disclosed. The device comprises a solar cell configured to generate electrical energy. The device further comprises a battery charger electrically connected to the solar cell. A battery is electrically connected to the battery charger and configured to store said electrical energy. An ultrasonic wave generator is electrically connected to the battery and configured to generate ultrasonic waves in a frequency range of 20 kHz to 100 kHz. A dimmer is electrically connected to the ultrasonic wave generator and configured to modulate the frequency of the ultrasonic waves. The device further comprises a dual-emitter configuration comprising one or more internal emitters configured for insertion into a trunk of the palm tree, wherein each of the internal emitters comprises a rigid cylindrical probe having a longitudinal axis and a distal end housing an ultrasonic transducer, wherein the distal end is in a form of a cylinder having a length that is no more than 0.05 times the length of the rigid cylindrical probe, and a width that is at least 10 times the width of the rigid cylindrical probe. The dual-emitter configuration further comprises at least one pair of external emitters configured to be positioned on an outside surface of the trunk of the palm tree, wherein each of the external emitters comprises a pair of directional ultrasonic transducers mounted on opposing sides of the trunk and housed within a flexible semicircular bracket adapted to hold each transducer of each pair of transducers directly opposite one another on the trunk and direct ultrasonic waves inwardly. Each of the internal emitters and the external emitters are electrically connected to the dimmer, configured to operate in coordination, and positioned relative to one another to direct ultrasonic waves toward overlapping regions of the palm tree, thereby promoting constructive interference. A digital screen is electrically connected to the battery and configured to display at least a frequency level and a battery percentage status.

In another exemplary embodiment, a method for mitigating boring insect infestations in a plant structure is disclosed. The method comprises generating ultrasonic waves at frequencies between 20 kHz and 100 kHz. The method further comprises transmitting the ultrasonic waves through a dual-emitter configuration comprising one or more internal emitters positioned within a trunk of a plant or tree, wherein each of the internal emitters comprises a rigid cylindrical probe having a longitudinal axis and a distal end housing an ultrasonic transducer, wherein the distal end is in a form of a cylinder having a length that is no more than 0.05 times the length of the rigid cylindrical probe, and a width that is at least 10 times the width of the rigid cylindrical probe. The dual-emitter configuration further comprises at least one pair of external emitters positioned on an outside surface of the plant structure, wherein each of the external emitters comprises a pair of directional ultrasonic transducers mounted on opposing sides of the plant structure and housed within a flexible semicircular bracket adapted to hold each transducer of each pair of transducers directly opposite one another on the plant structure and direct ultrasonic waves inwardly. The method further comprises synchronizing the internal emitters and external emitters to generate constructive interference patterns. The method further comprises disrupting insect behavior, including at least one of movement, orientation, communication, and reproduction.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
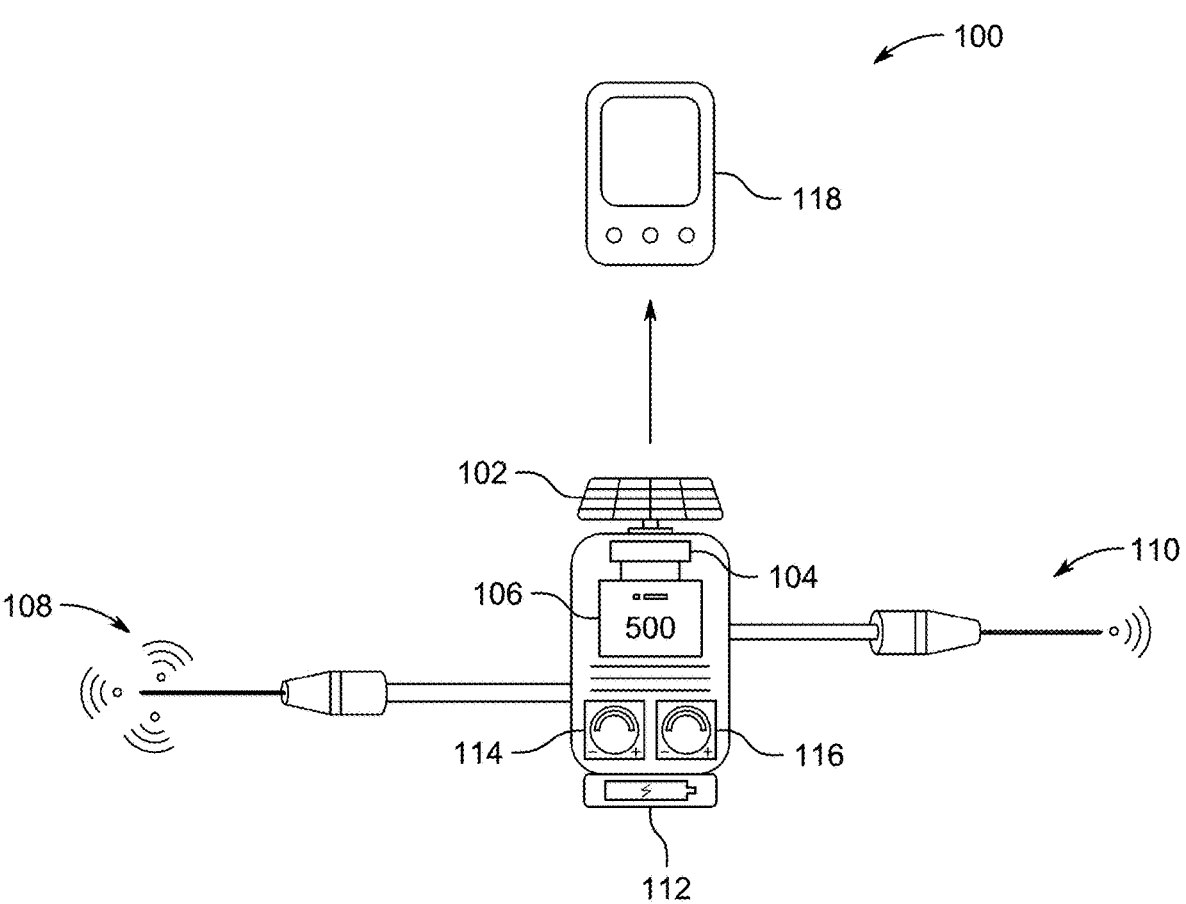
FIG. 1A is a schematic view of a red palm weevil infestation mitigation system installed in a palm tree, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure relates to a system and method for mitigating red palm weevil infestations and similar boring insect activity in palm trees. Insects such as red palm weevils cause internal damage to trees by burrowing into the trunk, making early detection and intervention difficult using conventional approaches. Existing techniques, including chemical treatments and pheromone traps, have limited efficacy, particularly in targeting insects located deep within the plant structure.

To address this limitation, the present disclosure provides a device that utilizes ultrasonic waves to interfere with insect behavior. The system comprises a solar-powered energy source connected to a battery, an ultrasonic wave generator, and a dimmer for modulating the output frequency. The ultrasonic emissions are delivered through a dual-emitter configuration, including one or more internal emitters positioned inside the trunk and at least one pair of external emitters mounted on opposite sides of the trunk. Each emitter contains ultrasonic transducers configured to operate in coordination and direct waves toward a common region, enabling constructive interference.

The device is configured to emit frequencies in the range of 20 kHz to 100 kHz. A display screen shows the frequency level and battery status. Optional features include thermal monitoring and a feedback loop using tissue impedance or temperature data to optimize power delivery. The disclosed system renders non-invasive, continuous disruption of insect activity through acoustic stimulation without the need for chemicals or manual intervention.

FIG. 1A illustrates a system 100 for mitigating red palm weevil infestations using phase-aligned (e.g., phase locked) ultrasonic interference. The system 100 comprises a solar charging system 102, a signal processor 104, a digital screen display 106, a source of internal frequency wave 108, a source of external frequency wave 110, a rechargeable battery 112, a power regulator 114, a dimmer 116, and an operational interface implemented through a mobile device 118. These components are electrically and functionally coupled to cooperatively perform autonomous ultrasonic pest disruption by emitting overlapping acoustic waves that propagate both internally through the tree structure and externally along its surface.

The system 100 operation begins with the solar charging system 102, which comprises one or more photovoltaic panels mounted on the housing or a separate frame. The solar charging system 102 is configured to convert incident solar energy into direct current (DC) electrical energy. Photovoltaic cells of the solar charging system 102 may be fabricated from monocrystalline silicon, polycrystalline silicon, or thin-film photovoltaic material, and may be configured with a conversion efficiency of at least 18%. The solar charging system 102 provides electrical input to the rechargeable battery 112 through a battery charger.

The rechargeable battery 112 may be implemented using lithium-ion, lithium iron phosphate, or lithium polymer cell chemistry. In one example, energy storage capacity is sufficient to power the system 100 continuously for at least 12 hours. The rechargeable battery 112 supplies power to all downstream modules during both solar and non-solar operating conditions.

Electrical output from the rechargeable battery 112 is routed through the power regulator 114, which stabilizes the supply voltage and filters electrical noise. The power regulator 114 may be implemented using DC-DC buck or boost converter topologies, and is configured to deliver a regulated voltage to both analog and digital subsystems. Downstream of the regulator 114, the signal processor 104 receives stable power and executes the core signal generation and control routines of the system 100.

The signal processor 104 may include a microcontroller, digital signal processor (DSP), or embedded system-on-chip (SoC) capable of waveform generation and timing control. Examples include STM32 microcontrollers, ARM Cortex-M cores, or Texas Instruments DSPs. The signal processor 104 is configured to generate ultrasonic frequency signals ranging from 20 kHz to 100 kHz. These signals may be configured as sinusoidal waves, square waves, frequency-swept pulses, or amplitude-modulated patterns, depending on treatment parameters. The signal processor 104 is further configured to manage synchronization between multiple transducer outputs to produce phase-aligned emissions targeted toward specified interference zones within and around the tree.

A dimmer 116 is electrically connected to the signal processor 104 and serves as a real-time frequency and intensity modulation unit. The dimmer 116 may be implemented using a digital potentiometer, rotary encoder, or programmable pulse-width modulation (PWM) controller. The dimmer 116 allows modulation of the output waveforms by adjusting frequency ranges or amplitude levels either manually or based on stored treatment profiles. In certain implementations, the dimmer 116 enables dynamic shifts between low-frequency and high-frequency operation to selectively disrupt different behavioral phases of red palm weevils, including movement (20-40 kHz) and communication or reproduction (40-100 kHz). In such cases, the dimmer 116 allows the user to alternate between low and high frequency pulse modes to enhance the effectiveness of ultrasonic propagation through different densities of tree tissue. This modulation capability of both the internal frequency wave source 108 and the external frequency wave source 110 enables tailored treatment cycles depending on the type of infestation or tree species being targeted.

In some embodiments, the dimmer 116 may include a control knob, slide, rocker, rotary, toggle, or digital interface that allows the operator to tune frequency and power output based on the plant composition and infestation level. For example, the dimmer 116 may be adjusted to different frequencies to accommodate different commercial crops such as date, coconut, and oil palms. In some cases, one or more dimmers 116 may be implemented in the system 100 to accommodate multiple frequency waves being emitted from different positions. For example, internal emitters propagating an internal frequency wave and external emitters propagating an external frequency wave may be configured to operate in coordination via the one or more dimmers 116 to promote constructive interference against red palm weevils.

The modulated ultrasonic signals are then directed to a source of internal frequency wave 108 and a source of external frequency wave 110. The internal frequency wave 108 is configured to propagate through the internal vascular regions of the palm tree, including xylem, phloem, and parenchyma tissues, where red palm weevil larvae are commonly located. The internal frequency wave 108 may be delivered using an ultrasonic transducer embedded within the trunk, housed in a rigid insertion probe constructed from stainless steel or polymer-composite materials. The transducer may include piezoelectric ceramics or MEMS-based emitters capable of generating high-intensity focused ultrasonic beams.

Simultaneously, the external frequency wave 110 is configured to propagate circumferentially along the outer surface of the trunk. The external frequency wave 110 may be generated using directional ultrasonic transducers mounted externally via brackets or flexible holders. These transducers are positioned on opposite sides of the tree trunk and are synchronized to emit phase-aligned acoustic waves that converge inwardly, thereby producing constructive interference within pest-affected tissue regions. In some implementations, the one or more external ultrasonic transducers may be mounted around the circumference of the tree trunk in a plane that is perpendicular to the longitudinal axis of the trunk, thereby ensuring even distribution of ultrasonic energy around the perimeter of the area. In such implementations, this orientation promotes constructive interference and uniform energy propagation into the internal layers of the tree for effective pest eradication. The combination of the internal frequency wave 108 and the external frequency wave 110 results in intersecting acoustic fields that enhance the vibrational amplitude at convergence points, which are disruptive to insect orientation, movement, communication, and reproduction.

The system 100 further comprises a digital screen display 106, which is electrically connected to the signal processor 104. The digital screen display 106, alternatively referred to as a display 106, is configured to render real-time operational data, including output frequency, waveform mode, battery percentage, temperature status, runtime duration, and fault indicators. The display 106 may be implemented using an LCD, TFT, or OLED panel with a graphical user interface (GUI). In some configurations, the display 106 includes capacitive or resistive touch input functionality, enabling the user to interact with menus, modify frequency profiles, initiate or pause treatment sessions, and access historical logs. The GUI on the display 106 may be configured with intuitive icons, numeric readouts, and user authentication controls to prevent unauthorized parameter modifications.

An operational interface implemented through the mobile device 118 is also connected to the signal processor 104 and provides extended remote interaction capabilities. The operational interface may utilize wireless communication modules such as Bluetooth Low Energy (BLE), Wi-Fi, Zigbee, or LoRa to interface with external user devices. Such communication modules allow the system 100 to transmit operational telemetry, battery performance data, or ultrasonic frequency logs to a mobile device, and also permits user-defined input profiles to be transmitted back to the system. In some implementations, the operational interface may be configured to receive environmental sensor data, such as ambient temperature or humidity, and automatically adjust frequency outputs based on preconfigured environmental response algorithms.

In certain embodiments, the one or more mobile devices 118 may interface with one or more smart devices configured to transmit, receive, or process control signals, data inputs, or output commands. The one or more mobile devices 118 may be a computing-enabled electronic device incorporating processing logic, memory, input/output interfaces, and communication modules. Exemplary mobile devices may include, but are not limited to, smartphones, tablet computers, smartwatches, wearable biometric sensors, smart speakers, smart televisions, laptops, connected vehicles, augmented reality (AR) headsets, and other network-enabled electronic systems.

In further embodiments, the system may include a data logger configured to record operational parameters such as ultrasonic frequency levels, duration of operation, and battery performance for performance tracking and maintenance analysis of the system 100. The data logger may store or transmit this information for maintenance scheduling and further optimization of pest control cycles. In some implementations, the data logger may communicate wirelessly with the one or more mobile devices 118 to provide real time updates on the efficiency and operational status of the system 100. In other implementations, the data logger may transmit data to be displayed via the operational interface or the digital screen display 106.

During field deployment, the system 100 operates autonomously by harvesting energy via the solar charging system 102 and storing the converted energy in the rechargeable battery 112. The power regulator 114 maintains consistent voltage to the signal processor 104, which generates and modulates ultrasonic frequencies using the dimmer 116. These modulated signals are directed simultaneously to the sources of internal frequency wave 108 and external frequency wave 110. The synchronized emission produces ultrasonic interference patterns that permeate the palm trunk and external surface. This interferometric acoustic environment is configured to impair the behavioral and physiological functions of red palm weevils across all developmental stages. The digital screen display 106 and the operational interface 118 allow real-time monitoring, control, and reconfiguration of operational parameters, enabling site-specific pest management strategies and adaptive treatment optimization.

Figure 1B:
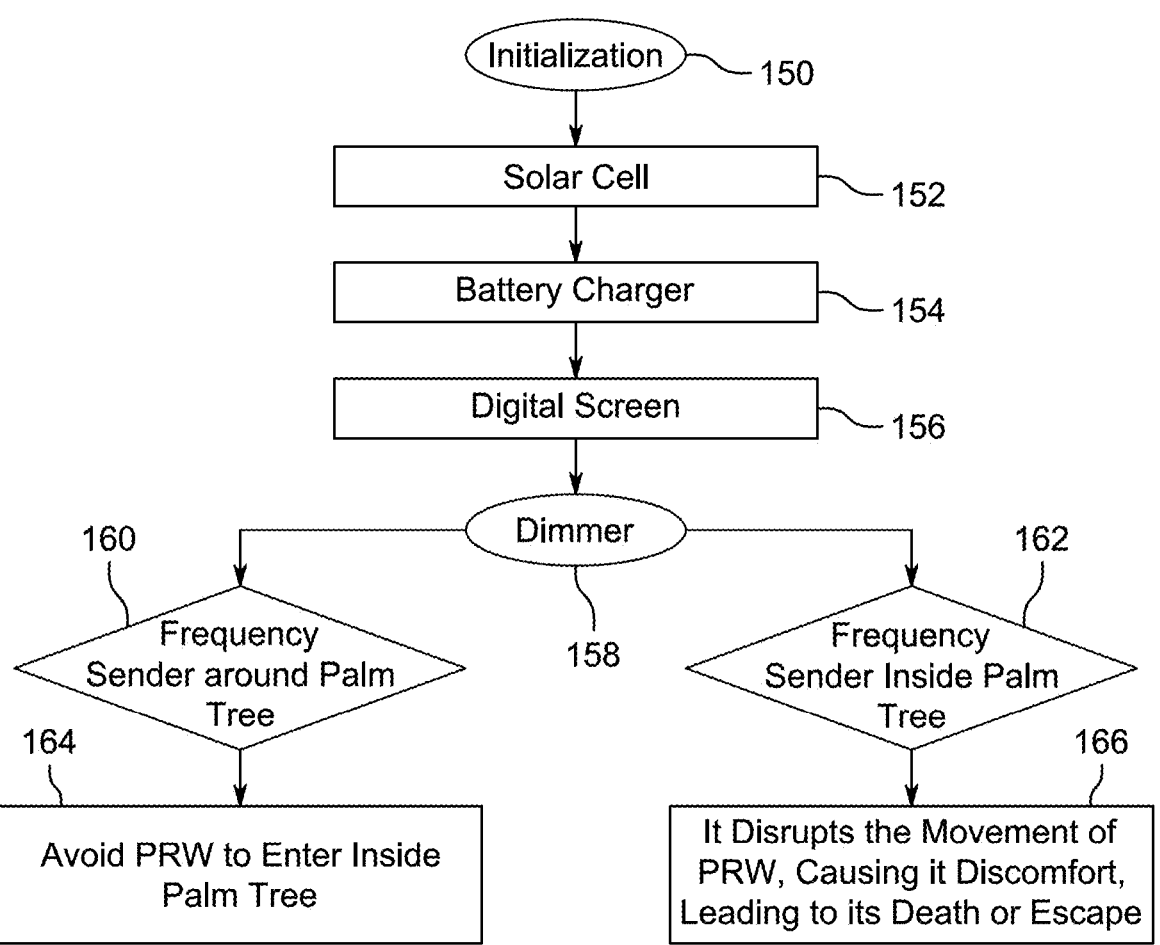
FIG. 1B is a perspective view of an internal emitter probe comprising an ultrasonic transducer at the distal tip, according to certain embodiments.

FIG. 1B illustrates a flow diagram of an autonomous ultrasonic pest mitigation system 100 configured to suppress red palm weevil (RPW) infestations in a palm tree using coordinated ultrasonic wave emission through internal and external transducer assemblies. The system 100 comprises an integrated set of hardware modules and logical operations that collectively enable generation, modulation, and targeted delivery of ultrasonic energy.

The operation of the system 100 is initiated via an initialization procedure 150, which activates the solar-powered subsystems and sets predefined operational parameters based on time-of-day, ambient temperature, or historical usage profiles. Upon initialization, a solar cell 152, implemented using one or more monocrystalline or polycrystalline photovoltaic panels, begins harvesting solar energy. The solar cell 152 is configured to achieve a conversion efficiency of at least 18 percent and is positioned to receive maximal solar irradiance throughout the operational window.

Electrical energy harvested by the solar cell 152 is routed to a battery charger 154 to regulate voltage and current delivered to a rechargeable battery. The battery charger 154 incorporates a power management integrated circuit (PMIC) with features including maximum power point tracking (MPPT), over-voltage protection, and programmable charge profiles. The battery charger 154 maintains a consistent and regulated energy supply to downstream electronic subsystems.

In additional implementations, the operation of the system 100 may be powered by rechargeable batteries or AC power. In some cases, the components may be connected through wired (e.g., coaxial or multi-pin) or wireless (e.g., Bluetooth or RF communication), and housings of the power sources are weather resistant (e.g., IP65 or higher) for reliable outdoor use in humid or tropical climates where palm trees are native to.

The regulated energy output is stored in a rechargeable battery coupled downstream of the battery charger 154. The battery may comprise a lithium-ion, lithium-polymer, or equivalent rechargeable cell with sufficient storage capacity to enable continuous system operation for at least twelve hours in the absence of solar input. The battery is configured to support peak current demands during ultrasonic wave generation and digital processing.

A digital screen 156 is operatively connected to the battery and forms part of the user interface subsystem. The digital screen 156 is configured to display real-time information including the current ultrasonic frequency setting, signal amplitude, and battery state of charge. In certain embodiments, the digital screen 156 comprises a touch-screen interface that enables the user to interact with frequency modulation controls, set duty cycles, define operation intervals, and review past performance logs. The screen may also integrate onboard diagnostics or alerts related to component health, ambient conditions, or signal interference.

The digital screen 156 interfaces with a dimmer module 158, which is responsible for frequency modulation of the ultrasonic signal. The dimmer module 158 may be implemented using digital potentiometers, analog pulse-width modulation (PWM) circuits, or digitally controlled attenuators, and is configured to adjust frequency outputs within the 20 kHz to 100 kHz range. Frequencies between 20 kHz and 40 kHz are primarily directed to disrupt RPW movement, while frequencies between 40 kHz and 100 kHz are optimized to interfere with RPW communication and reproductive signaling. The dimmer 158 is configured to modulate output dynamically based on predefined rules or through manual input via the digital screen 156.

The modulated signal from the dimmer 158 is simultaneously transmitted to two distinct frequency-emitting assemblies: an external frequency sender 160 and an internal frequency sender 162. The external frequency sender 160 comprises a pair of directional ultrasonic transducers mounted on a flexible semicircular bracket that is adapted to conform to the outer curvature of the palm tree trunk. Each transducer is positioned to face directly toward its counterpart on the opposite side of the trunk to direct ultrasonic waves inwardly, ensuring maximal acoustic coupling and forming constructive interference zones at defined convergence points within the tree structure.

The internal frequency sender 162 includes one or more rigid cylindrical probes configured for insertion into the vascular interior of the palm tree. Each probe houses an ultrasonic transducer at its distal end, with the end portion shaped as a short, wide cylinder having a length no more than five percent of the probe length and a width at least ten times greater than the probe diameter. The design facilitates dispersion of ultrasonic waves through longitudinal vascular tissues such as xylem and parenchyma.

Both the external frequency sender 160 and the internal frequency sender 162 operate in synchrony, with phase-locking mechanisms ensuring that emitted waves constructively interfere across overlapping regions of the palm tree trunk. This interference amplifies ultrasonic intensity in targeted zones, thereby enhancing disruption of red palm weevil behavior.

The external frequency sender 160 is primarily tasked with preventing RPW from entering the tree, as represented by process block 164. By emitting ultrasonic energy at surface-accessible regions, the external assembly deters adult weevils from initiating boring or laying eggs on the palm trunk. In parallel, the internal frequency sender 162 propagates energy internally to induce physiological stress in larvae and pupae already embedded within the trunk. This results in impaired motor coordination, disorientation, or mortality of the pests, as indicated by process block 166.

The modules form an integrated ultrasonic pest deterrence system wherein each component of the system 100 is functionally interdependent and contributes to the overall objective of mitigating RPW infestations without chemical interventions. The system is designed to operate autonomously using renewable energy and features configurable treatment protocols through user interfaces or sensor-based automation.

Figure 2:
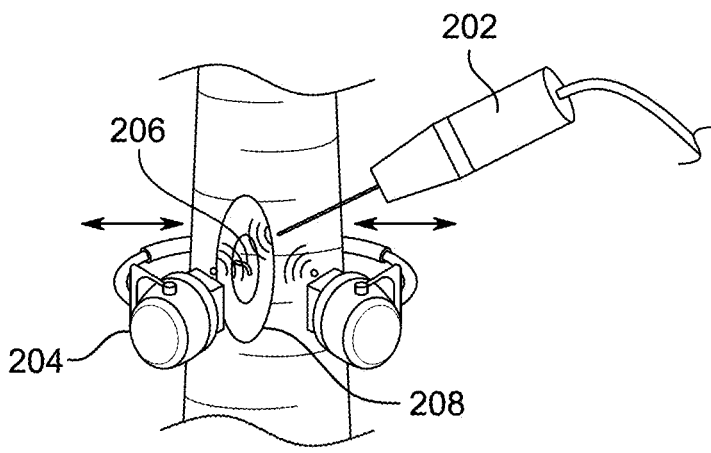
FIG. 2 is a schematic illustration of the placement of internal and external ultrasonic emitters configured to produce overlapping ultrasonic fields for constructive interference, according to certain embodiments.

FIG. 2 illustrates a schematic cross-sectional representation of a palm tree trunk depicting the spatial configuration and functional integration of the ultrasonic emission components of system 100. As shown, an internal emitter 202 alternatively referred to as an internal probe 202, is inserted into a pre-drilled borehole formed within the palm tree trunk and is positioned proximal to a red palm weevil (RPW) larval infestation cavity 206. The internal emitter 202 comprises a rigid cylindrical probe having a longitudinal axis and a distal end housing an ultrasonic transducer. The distal end is in a form of a cylinder having a length that is no more than 0.05 times the length of the rigid cylindrical probe, and a width that is at least 10 times the width of the rigid cylindrical probe. The rigid cylindrical probe is implemented using stainless steel, titanium, or reinforced polymer composite materials, selected for their mechanical durability and acoustic propagation characteristics.

The ultrasonic transducer embedded at the distal end of the internal emitter 202 may include piezoelectric disk stacks, Langevin-type resonators, or capacitive micromachined ultrasonic transducers (CMUTs). The transducer is configured to emit ultrasonic waves in a frequency range of 20 kHz to 100 kHz. In one configuration, the ultrasonic energy is axially directed along the longitudinal axis of the probe to penetrate deep into the tissue, while in another configuration, the transducer may be radially oriented to provide lateral wave dispersion into surrounding tissue volumes. The internal emitter 202 may further incorporate anchoring features such as barbed extensions, external threads, or expandable flanges to ensure secure mechanical engagement and effective acoustic coupling with the internal tree tissue once positioned within the pre-drilled borehole. In some embodiments, an acoustic gel or coupling buffer may be applied at the probe-tree interface to minimize reflection losses.

In some embodiments, the distal end of the internal emitter 202, alternatively referred to the internal probe 202, is configured as a short cylindrical emitting head with an axial length no greater than 0.05 times the overall length of the rigid probe and a radial width at least ten times the width of the probe shaft. This configuration provides an enlarged acoustic radiating surface that maximizes energy transfer into the tree trunk while minimizing insertion depth, thereby preventing damage to the tree. In some cases, the wide geometry enables formation of a localized ultrasonic pressure zone near the tip of the internal probe 202, thus enhancing the constructive (e.g., destructive) interference when operated in conjunction with the external semicircular bracket emitter. The increased diameter of the distal end also improves mechanical stability and contact with internal wood fibers, ensuring consistent energy coupling during operation of the internal probe 202.

For example, the internal emitter 202 may be inserted into the trunk to deliver ultrasonic waves directly into a core of a tree. In some cases, the probe may resemble a slender, needle-like shaft, possibly ranging from 10 cm to 45 cm in length and 3 mm to 12 mm in diameter. As described herein, the internal emitter 202 may include ultrasonic emitters that are embedded along the length of the probe to propagate longitudinal sound waves through the wood of the tree.

In certain embodiments, the enlarged distal head may be detachable for replacement or cleaning or fabricated from an acoustically conductive polymer or metal alloy chosen to match the impedance characteristics of palm tree tissue. This configuration maintains effective energy distribution while preserving structural integrity of the probe during installation and use.

Opposite the internal emitter 202, an external emitter 204 is positioned on an outside surface of the palm tree trunk. The external emitter 204 comprises a pair of directional ultrasonic transducers mounted on opposing sides of the trunk and housed within a flexible semicircular bracket. The flexible semicircular bracket is adapted to hold each transducer of each pair of transducers directly opposite one another on the trunk and direct ultrasonic waves inwardly. In some cases, the pair of transducers connected to the flexible semicircular bracket may resemble a pair of headphones, comprising two transducer muffs or housings connected by the flexible semicircular bracket or ring, wrapping around the trunk of a tree. In one exemplary embodiment, the semicircular bracket is fabricated from elastomeric materials or articulated metal bands that allow adaptive curvature to fit trunks of varying diameters. In other implementations, the bracket may be configured with hook-and-loop fasteners, tension springs, or ratcheting clamps to ensure consistent pressure and alignment of transducers around the trunk surface.

In some implementations, the flexible semicircular bracket of the external emitter 204 may resemble a semicircular ring. The semicircular ring is configured to wrap partially or fully around a palm tree trunk. In some cases, the inner diameter of the ring may range from 20 cm to 120 cm to accommodate a variety of palm trunk diameters. In some cases, the band width of the semicircular ring may range from 5 cm to 15 cm, and the thickness may range from 1 cm to 3 cm.

In other implementations, the flexible semicircular bracket is adjustable to fit a range of trunk diameters. In some cases, the bracket may incorporate a telescoping arcuate member in which two or more concentric arcuate rails slide longitudinally with respect to one another. In some cases, telescoping sections include calibrated detents or continuous friction fit to permit selection of an inner diameter within a specified range. For example, an inner diameter with a range from 20 cm to 120 cm may accommodate varying trunk diameters, as described herein. Alternatively, the flexible semicircular bracket may employ an overlapping sliding design in which the free ends of adjacent segments may overlap and be secured after adjustment.

In further implementations, the flexible semicircular bracket may include telescoping or hinged extensions to allow adjustment of curvature or diameter for the bracket to fit different trunk sizes. In certain embodiments, multiple brackets may interlock around the circumference of the trunk of a palm tree using clamps, magnets, or quick-release fasteners, forming a continuous array of emitters. In some cases, the inner surface of the flexible semicircular bracket may carry acoustic coupling pads made of silicone or elastomeric gel, ranging from 3 mm to 10 mm thick, to ensure uniform contact with irregular bark surfaces and to protect the tree from excessive clamping force.

In some embodiments, the semicircular bracket includes multiple directional ultrasonic transducers, typically 3 cm to 6 cm in diameter, evenly spaced along the inner surface at about 10 cm to 30 cm intervals. The number of directional transducers on the semicircular bracket may range from 5 to 15, depending on the size of the trunk and power density of the transducer.

Each directional ultrasonic transducer of the external emitter 204 may be implemented as a flat or concave piezoelectric ceramic disc, an array of miniaturized ultrasonic drivers, or a horn-coupled Langevin stack, oriented to emit focused or beam-steered ultrasonic waves toward the central axis of the trunk. The opposing arrangement of the pair ensures that ultrasonic energy is directed from both sides of the trunk toward an overlapping focal region. The spatial positioning of the external emitter 204 is aligned relative to the internal emitter 202 to ensure that their respective ultrasonic emissions intersect within an interior region of the trunk. The ultrasonic propagation paths converge at a target volume surrounding the RPW larva 206, forming an ultrasonic emission zone 208.

The emission zone 208 defines an ultrasonic interference region where the phase-aligned waves from the internal emitter 202 and external emitter 204 reinforce one another, producing constructive interference. This results in increased local acoustic pressure, enhancing wave intensity within the trunk tissue. In one configuration, the internal and external emitters may be phase-synchronized using a common timing controller or phase delay compensator integrated within the signal modulation circuitry. In another embodiment, the external emitter 204 may include a mobile adjustment mechanism to fine-tune transducer positioning and orientation based on feedback from temperature sensors or tissue impedance monitoring.

The constructive interference generated within the ultrasonic emission zone 208 is configured to disrupt physiological functions of the RPW larva 206, including neural signaling, feeding, orientation, communication, and reproduction. The amplitude and waveform of the ultrasonic emissions may be modulated dynamically based on trunk geometry, infestation depth, or environmental conditions to optimize energy transfer and biological efficacy.

In some implementations, the system 100 includes both the internal emitter 202 and the external emitter 204 in order to target red palm weevils residing within the trunk of palm trees. The emitters operate cooperatively to generate constructive interference of ultrasonic waves, resulting in concentrated vibrational energy lethal to larvae and adult insects, such as the red palm weevil species. During operation, system 100 activates both the internal emitter 202 and the external emitter 204 in coordination. Each of the internal emitters and the external emitters are electrically connected to a dimmer that modulates the frequency, intensity, and phase of the ultrasonic signals. The dimmer receives input from a signal generator and may be interfaced with a controller or processor that enables real-time adaptation to varying infestation parameters. The deployment of the internal emitter 202 in conjunction with the external emitter 204 facilitates the formation of a composite acoustic field that is strategically concentrated at biologically relevant internal locations within the palm tree, thereby enhancing pest disruption without reliance on chemical agents.

Figure 3:
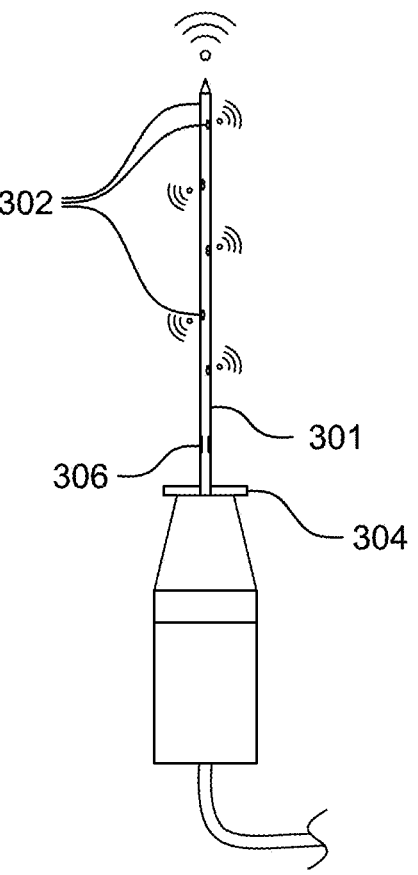
FIG. 3 is a system diagram showing electrical connectivity between the solar cell, battery, ultrasonic wave generator, and dimmer, according to certain embodiments.

FIG. 3 illustrates an exemplary structural configuration of an internal probe assembly designed to emit focused ultrasonic waves within the vascular structure of a palm tree, particularly for the disruption and mitigation of red palm weevil larvae embedded deep within the trunk tissue. The internal probe includes a cylindrical housing 301, which may be fabricated from stainless steel, titanium alloy, or a reinforced composite material, selected to ensure mechanical robustness, thermal stability, corrosion resistance against plant sap, and inert interaction with plant tissues. The outer surface of the cylindrical housing 301 may optionally be treated with a biocompatible sap-repellent coating such as polytetrafluoroethylene (PTFE) or a siliconized polymeric film to prevent residue accumulation during repeated insertions.

The cylindrical housing 301 is dimensioned with an outer diameter in the range of approximately 12 mm to 25 mm, thereby facilitating seamless insertion into boreholes drilled within the palm trunk, without inducing structural damage to surrounding tissues. The longitudinal length of the internal probe may range from approximately 15 cm to 25 cm, depending on the diameter and depth profile of the target tree. The distal end of the cylindrical housing 301 is contoured into a rounded or tapered shape to reduce insertion resistance and ensure proper seating within the borehole during deployment.

Positioned within the internal housing 301 is at least one piezoelectric transducer element 302, configured to generate ultrasonic vibrations in the frequency range of approximately 20 kHz to 100 kHz. The piezoelectric transducer element 302 may comprise a lead zirconate titanate (PZT) crystal, a barium titanate-based ceramic, or a composite multilayered piezoelectric laminate. The placement of the piezoelectric transducer element 302 is designed to achieve axial emission, projecting the generated acoustic waves directly into the surrounding vascular tissue regions and infestation zones.

To ensure safe and accurate insertion, the probe further comprises an insertion depth limiter or collar 304 positioned proximally to the distal end. The insertion depth limiter 304 provides a mechanical stop aligned with a calibrated depth threshold corresponding to the target larval cavity region. In some cases, a desired insertion depth of the probe may include a range of approximately 4 cm to 10 cm into a trunk of a palm tree. The insertion depth limiter 304 may be fixed or adjustable and may further include measurement graduations or markings for visual alignment.

A signal and power transmission cable are mechanically and electrically connected to the proximal end of the cylindrical housing 301. The cable may include coaxial shielding, insulation sheathing, and flexible strain relief boots to preserve signal integrity and ensure electrical isolation under outdoor operating conditions. The cable transmits high-frequency excitation signals to the piezoelectric transducer element 302 and may additionally relay sensor feedback data to a connected control unit.

A thermocouple sensor 306 is embedded within or affixed to the surface of the cylindrical housing 301. The thermocouple sensor 306 is configured to measure the local temperature of the surrounding tissue during ultrasonic operation, thereby enabling real-time monitoring of thermal effects induced by acoustic wave absorption. The thermocouple sensor 306 may be implemented using Type-K, Type-T, or micro-bead sensors, and may be functionally connected to a temperature regulation module in the system's control circuitry for automatic adjustment or shutdown in the event of excessive localized heating.

The combination of the piezoelectric transducer element 302, the cylindrical housing 301 with defined geometry and material properties, the signal and power cable, the insertion depth limiter 304, and the thermocouple sensor 306 collectively define a modular and field-deployable internal probe. The internal probe is optimized for targeted ultrasonic delivery within the palm tree structure and supports interference-based ultrasonic treatment when operated in conjunction with an external probe to induce constructive acoustic superposition at infestation sites, as illustrated in FIG. 2.

Figure 4:
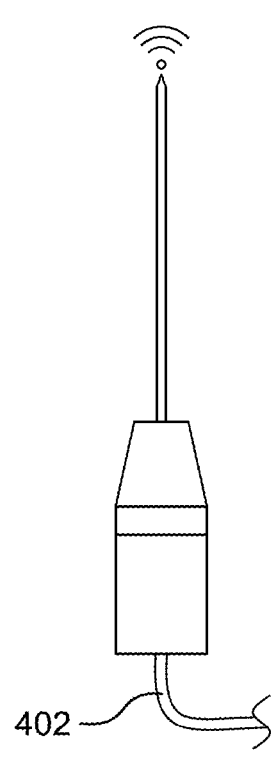
FIG. 4 is a block diagram depicting the control flow from solar energy harvesting to frequency modulation and emitter actuation, according to certain embodiments.

FIG. 4 illustrates a detailed schematic view of an external probe 402 configured for surface-mounted or shallow insertion deployment on the bark of a palm tree, as part of an ultrasonic pest mitigation system designed to disrupt red palm weevil infestation through acoustic interference.

The external probe 402 comprises a cylindrical housing constructed from corrosion-resistant materials such as stainless steel, carbon fiber composite, or polycarbonate-based thermoplastics, selected for their mechanical durability, environmental stability, and acoustic coupling properties when exposed to external tree bark or organic surfaces. The cylindrical housing has a length ranging from 12 to 25 centimeters and a diameter of approximately 15 to 25 millimeters, which may vary based on tree species and required acoustic footprint. The outer surface of the housing may optionally be coated with sap-resistant polymeric material to prevent biofouling or resin accumulation during prolonged outdoor deployment.

The external probe 402 is electrically and functionally coupled to a signal generator and control circuitry via a shielded cable, which provides both power supply and frequency input signals. The cable is configured to support power delivery and bi-directional data communication using twisted-pair lines or coaxial shielding to minimize signal attenuation and environmental interference. In certain embodiments, the cable may terminate in waterproof connectors to enable hot-swappable deployment in field conditions.

The external probe 402 is operatively configured to house an embedded piezoelectric transducer within its emission end, which may be implemented using lead zirconate titanate (PZT) or other high-coupling piezoelectric ceramics. The transducer is designed to emit high-frequency acoustic waves, typically within the 20 kHz to 100 kHz ultrasonic band, which are tuned to affect the auditory or neurological systems of the red palm weevil. The emission pattern may be directional or omnidirectional depending on the internal baffle geometry, probe placement, and surrounding tree curvature.

In some implementations, the external probe 402 is optionally equipped with a mounting interface (not shown in the present figure) such as a clamp, bracket, or elastic band, enabling secure surface attachment to the outer bark of the tree. The probe may be installed at variable heights or angular orientations to control the direction and field of ultrasonic wave propagation. In alternate embodiments, the external probe 402 may be shallowly inserted into a peripheral borehole to simulate internal emission, functioning in a dual-mode configuration to supplement or replace a primary internal probe.

During operation, the external probe 402 receives frequency-modulated signals via the cable from a system controller, typically configured to align phase, timing, and amplitude with a corresponding internal ultrasonic source. This alignment facilitates the formation of an ultrasonic interference field within the tree structure, targeting the behavioral and physiological disruption of red palm weevils. The external probe 402 thus operates in conjunction with other system components to extend acoustic coverage, reinforce wave interference, and create lethal or repellent conditions within and around the tree structure.

Figure 5:
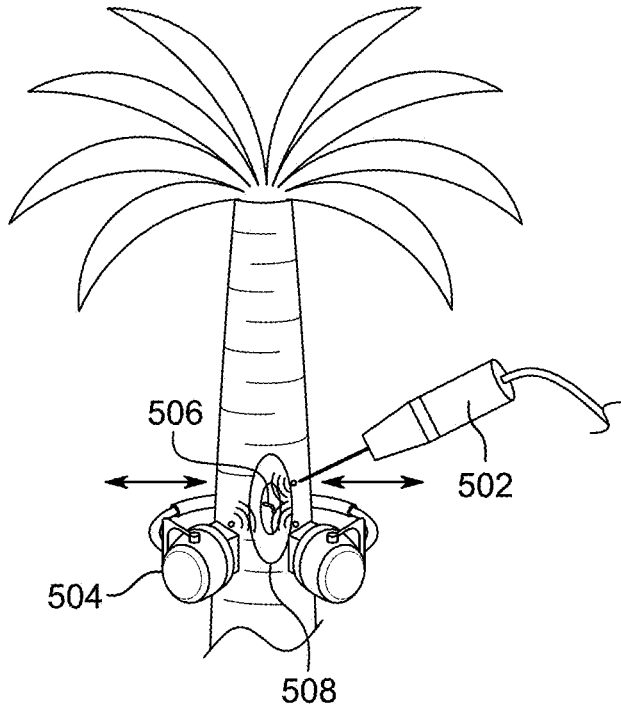
FIG. 5 is a perspective view showing installation of internal probes into the trunk of the palm tree, according to certain embodiments.

FIG. 5 illustrates a schematic diagram of constructive wave interaction within a palm tree trunk using dual ultrasonic probes, according to certain embodiments. The system comprises an internal probe 502 and an external probe 504 deployed on opposite sides of the palm tree 506. The internal probe 502 is configured to be inserted into a borehole proximate to a larval infestation site, while the external probe 504 is positioned externally on the bark surface or shallowly inserted, such that both probes 502 and 504 are aligned to direct ultrasonic emissions toward a common focal region.

The ultrasonic emissions from the internal probe 502 and the external probe 504 are represented as expanding acoustic wavefronts, each comprising phase-synchronized pulses configured to interfere constructively. The convergence of these wavefronts defines a constructive interference zone 508, wherein the amplitude of the acoustic pressure is maximized due to in-phase superposition. This constructive interference zone 508 is spatially aligned with the location of a red palm weevil (RPW) larva situated within the internal structure of the palm tree 506.

The configuration of the internal probe 502 and the external probe 504 is selected based on the geometry of the palm trunk and the known behavioral patterns of RPW larvae, such that the energy density within the constructive interference zone 508 is sufficient to induce disorientation, internal disruption, or escape response in the RPW larva. The alignment of probes and wavefronts enables localized ultrasonic intensification, minimizing energy dispersion and collateral impact on non-target regions of the tree.

Figure 6:
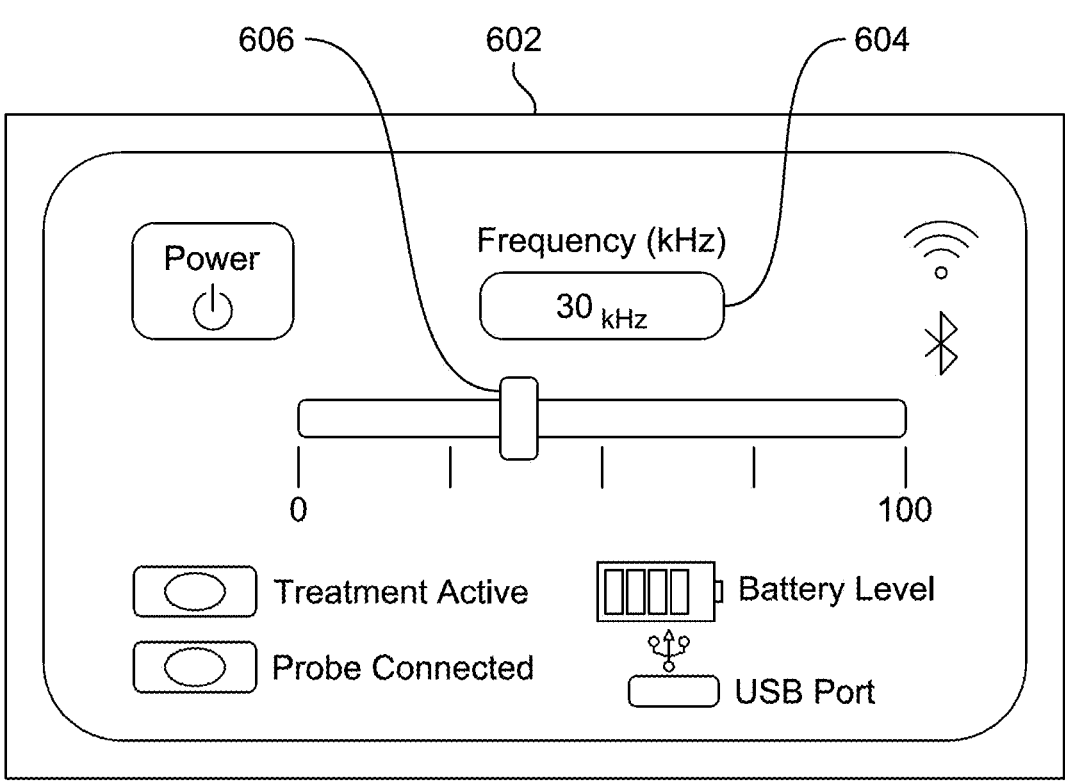
FIG. 6 is a schematic diagram of external emitters housed in flexible semicircular brackets mounted to opposing sides of a palm tree trunk, according to certain embodiments.

FIG. 6 illustrates a control interface or user panel configured for the operational management of the ultrasonic pest disruption system. The control interface includes a touchscreen display 602, which serves as the primary user interaction surface and is operatively configured to display system parameters, receive user input, and manage ultrasonic emission settings.

The touchscreen display 602 incorporates a frequency screen display 604, which visually presents the currently selected ultrasonic output frequency in kilohertz. The frequency screen display 604 is configured to update dynamically in response to user inputs or internal control signals, reflecting the real-time frequency output applied to the probes.

A frequency level controller 606 is positioned below the frequency screen display 604. The frequency level controller 606 is implemented as a linear slider control operable via the touchscreen display 602 and is configured to adjust the ultrasonic output frequency over a selectable range, for example, from 20 kilohertz to 100 kilohertz. The frequency level controller 606 is electrically coupled to the system's frequency modulation circuitry to permit precise tuning of acoustic output characteristics.

The touchscreen display 602 further comprises graphical indicators configured to display operational statuses. These include a "Treatment Active" status indicator that confirms activation of ultrasonic output, a "Probe Connected" status indicator that confirms successful coupling of the internal and external probes to the system, and a "Battery Level" indicator that represents the charge state of the system's onboard power supply.

Additionally, the touchscreen display 602 includes graphical icons denoting system connectivity features. A Bluetooth icon is displayed to indicate the availability of wireless pairing functionality for external devices, and a Wi-Fi icon is shown to denote network connectivity capabilities. These connectivity features enable extended functionality such as remote configuration, telemetry, firmware updates, or integration with mobile applications for monitoring and control.

The touchscreen display 602 also includes a USB icon indicating the presence of a USB interface, which may be used for system diagnostics, power delivery, or data transfer operations.

Figure 7:
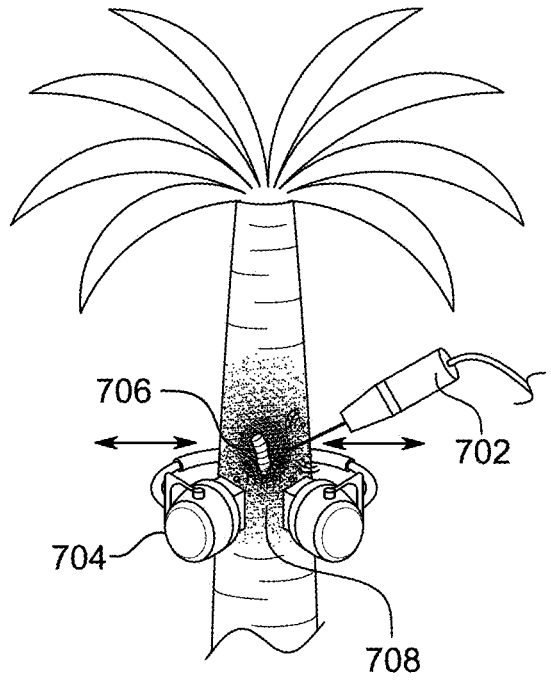
FIG. 7 illustrates the geometric orientation of internal and external emitters relative to the longitudinal axis of the trunk, according to certain embodiments.

FIG. 7 illustrates a simulated ultrasound field distribution within the trunk of a palm tree, demonstrating spatial energy concentration achieved through constructive acoustic interference, according to certain embodiments. The system 100 comprises an internal probe 702 and an external probe 704 positioned on opposing sides of the tree trunk, such that acoustic energy from both transducer elements is directed toward a predefined focal region. The internal probe 702 is operatively inserted into a borehole within the palm trunk, whereas the external probe 704 is surface-mounted or shallowly embedded along the outer bark. Each of the probes 702 and 704 is configured to emit phase-synchronized ultrasonic waves within a frequency range suitable for disrupting soft-bodied insects.

The ultrasound field distribution is depicted as a pseudo-colored intensity map superimposed over a grayscale illustration of the palm tree trunk. The intensity distribution forms a spatial energy pattern wherein concentric gradients represent zones of increasing acoustic pressure. As seen in the figure, the emitted wavefronts from both the internal probe 702 and the external probe 704 intersect within a localized region of overlap, resulting in a constructive interference zone 708. This constructive interference zone 708 represents a focal hotspot where acoustic pressure amplitude is significantly enhanced due to in-phase summation of wavefronts originating from both probes.

Located within this high-pressure zone is a representation of a red palm weevil (RPW) larva 706, placed in close spatial alignment with the region of peak energy convergence. The positioning of the RPW larva 706 within the constructive interference zone 708 is exemplary of the intended use-case, wherein pest targets residing within the tree are exposed to maximized ultrasonic intensity without necessitating high-power operation across the entire trunk volume.

The configuration of the internal probe 702 and external probe 704, and the resulting field distribution, visually validate the efficacy of synchronized dual-probe emission in focusing acoustic energy toward infested regions. By concentrating vibrational energy at the target site, the system 100 enables selective disruption of larval tissues with reduced energy dissipation through the surrounding plant structure. FIG. 7 thereby reinforces the technical advantage of spatially resolved ultrasonic treatment enabled through phased acoustic interference.

Figure 8:
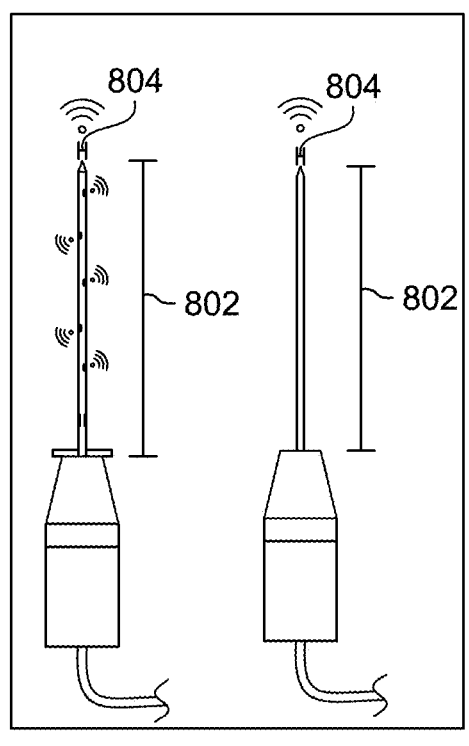
FIG. 8 depicts the constructive interference zone formed by synchronized ultrasonic waves from internal and external emitters, according to certain embodiments.

FIG. 8 illustrates structural views of a probe body, showing dimensional specifications of the insertion shaft configured for ultrasound treatment delivery. The probe includes a cylindrical shaft 802 with an axial length in the range of approximately 15 mm to 25 mm and an outer diameter in the range of approximately 12 mm to 25 mm, as denoted by reference numeral 804. The shaft 802 is composed of a biocompatible, durable material such as stainless steel or a high-strength composite polymer, optionally coated to provide resistance against internal sap or moisture infiltration. The shaft 802 is adapted for insertion into a pre-drilled borehole within a tree trunk and is configured to maintain mechanical integrity under high acoustic load conditions. The outer geometry and diameter range 804 facilitate operational compatibility across varying palm species with differing trunk diameters, thereby enabling secure seating and effective energy transmission during probe deployment. The internal wiring and acoustic pathway are enclosed within shaft 802 and are electrically coupled to the transducer element illustrated in subsequent figures.

Figure 9:
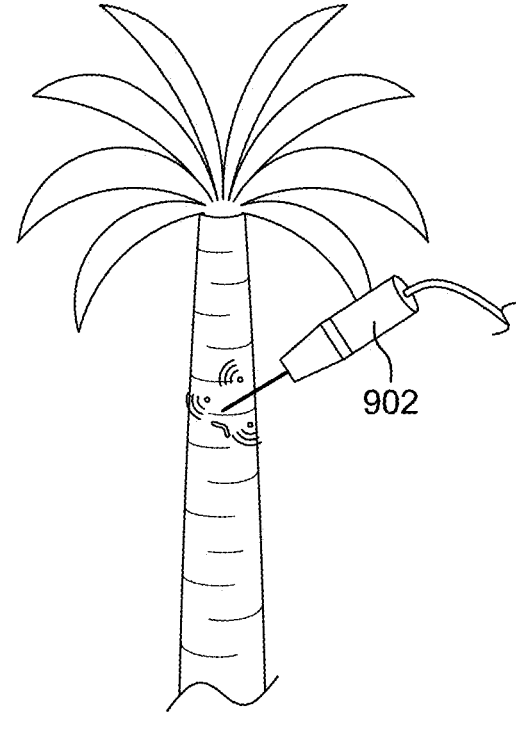
FIG. 9 illustrates a top-down view of emitter alignment for maximizing acoustic field overlap, according to certain embodiments.

FIG. 9 illustrates the spatial positioning of an ultrasound transducer element 902 within the internal probe, embedded in a trunk of a palm tree. The transducer element 902 is positioned proximate to or at the distal tip of internal probe and is configured to generate ultrasonic energy across a tunable frequency range between 20 kHz and 100 kHz. The transducer element 902 may comprise a Langevin-type transducer or a piezoelectric disk or stack, depending on implementation-specific requirements. The axial orientation of the transducer element 902 allows for directed longitudinal energy propagation toward interior larval infestation zones, whereas a radial orientation enables lateral wave dispersion suitable for targeting peripheral larval cavities. The transducer element 902 is acoustically coupled to internal structures of the probe and is driven via electrical excitation received from a connected control unit. The deployment within the palm trunk, as depicted, facilitates focused acoustic energy delivery toward red palm weevil larvae residing within the targeted region.

Figure 10:
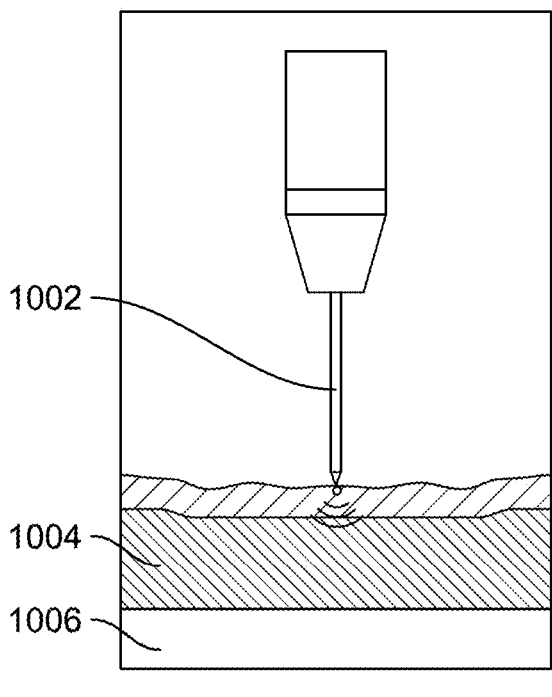
FIG. 10 is a front view of a digital screen display showing battery percentage and frequency level, according to certain embodiments.

FIG. 10 depicts an acoustic coupling configuration for optimal transmission of ultrasound energy from the probe 1002 into the internal tree structure. The distal tip of the probe 1002 is in direct contact with tree tissue 1004 beneath the outer bark layer 1006. An acoustic coupling medium is disposed between the transducer interface and the tree tissue 1004 to minimize acoustic impedance mismatch. The coupling medium may include gel, water-based fluid, or a polytetrafluoroethylene (PTFE) buffer layer. This configuration ensures that ultrasonic energy generated by the transducer is effectively coupled into the xylem and phloem regions of the palm tree, thereby allowing energy propagation toward the targeted larval region without significant reflection or dissipation at the interface. The placement of the probe 1002 relative to the tree tissue 1004 and the bark

1006 further enables stabilization of the probe during operation and enhances energy transmission fidelity under field deployment conditions.

Figure 11:
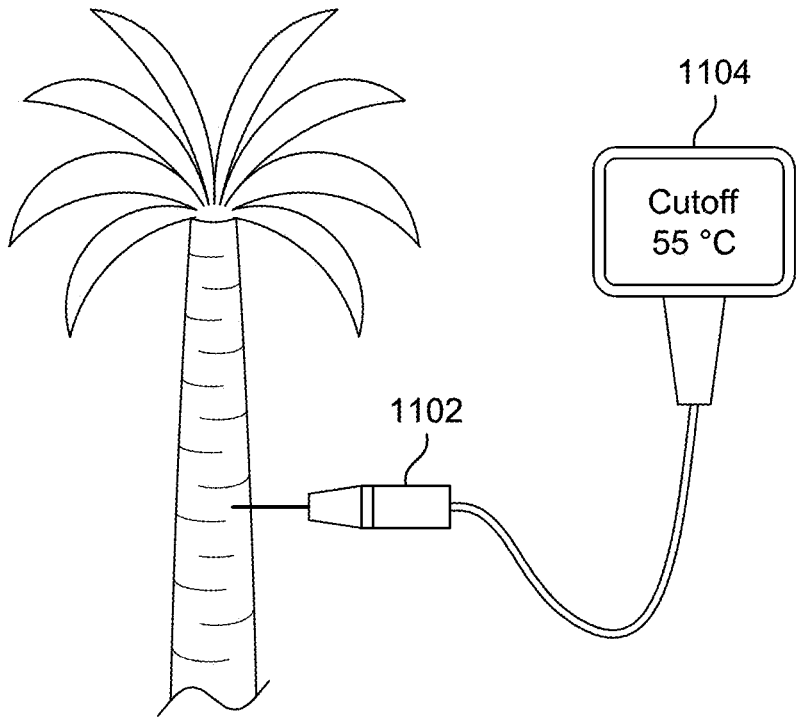
FIG. 11 illustrates a thermal monitoring system including a thermocouple connected to a cutoff controller for safety regulation, according to certain embodiments.

FIG. 11 illustrates a thermal or safety monitoring configuration employed in an ultrasound-based pest control system, according to certain embodiments. A thermocouple sensor 1102 is positioned near the ultrasound emission region on the tree trunk to monitor the localized temperature during treatment. The thermocouple sensor 1102 is operatively coupled to a display unit 1104, which visually indicates the real-time temperature and incorporates a thermal cutoff feature programmed to terminate ultrasonic emission upon detecting a temperature exceeding a safety threshold, such as 55 degrees Celsius. The display unit 1104 enables automated cessation of energy delivery to mitigate the risk of overheating and ensures thermal protection of the surrounding tree tissue and bark structure during active treatment sessions.

Figure 12:
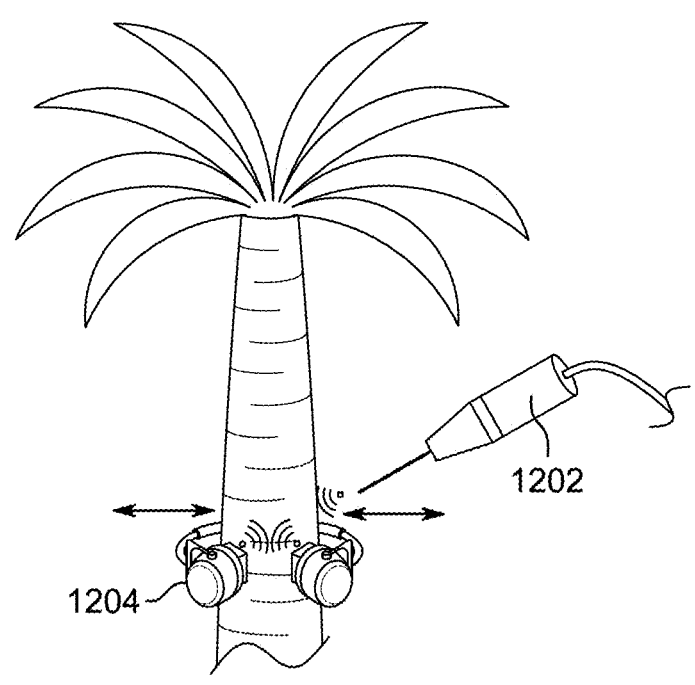
FIG. 12 illustrates a modular external probe arrangement mounted on opposite sides of the tree trunk for dual-sided ultrasonic emission, according to certain embodiments.

FIG. 12 depicts a modular external probe configuration for directional ultrasound emission, according to certain embodiments. A primary modular probe 1202 is deployed on one side of the tree trunk, either externally mounted or partially inserted, and a secondary modular probe 1204 is positioned on the opposite side. Both modular probes 1202 and 1204 are configured to operate under synchronized phase control to generate constructive interference within the target treatment zone inside the trunk. The system architecture enables focused acoustic energy delivery by leveraging the modular arrangement, thereby enhancing the therapeutic efficacy against internal larval infestations while allowing flexibility in probe positioning for different tree geometries.

Figure 13:
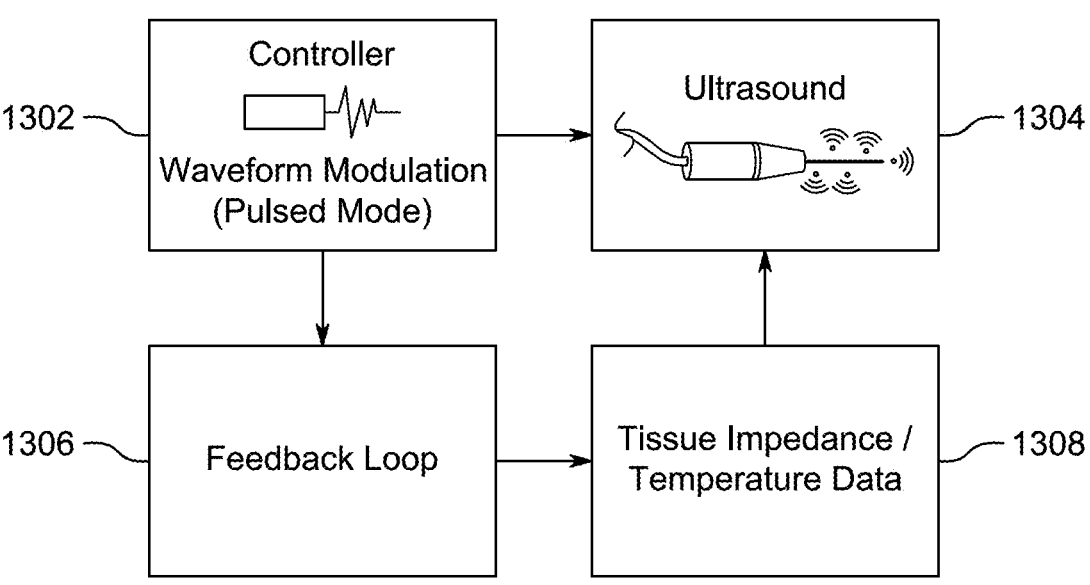
FIG. 13 is a functional block diagram showing optional system improvements incorporating pulsed waveform modulation and a feedback loop using tissue impedance and temperature data, according to certain embodiments.

FIG. 13 illustrates an exemplary control system for ultrasound power modulation incorporating tissue-responsive feedback, according to certain embodiments. The system includes a controller 1302 configured to implement waveform modulation, such as pulsed mode operation, for driving an ultrasound transducer 1304. The controller 1302 is operatively coupled in a feedback loop 1306 configured to dynamically adjust output parameters based on real-time sensing data. The ultrasound transducer 1304 is configured to deliver acoustic energy into plant tissue and is further operatively coupled to a sensing module that generates tissue impedance or temperature data 1308. The tissue impedance or temperature data 1308 is communicated back to the feedback loop 1306 to optimize energy delivery and prevent thermal or structural damage to the tree. The control system enables closed-loop modulation of acoustic output by adjusting power levels, duty cycle, or pulse width based on the detected biophysical characteristics of the tissue, thereby maintaining thermal safety while maximizing ultrasound penetration into the target emission zone.

Figure 14:
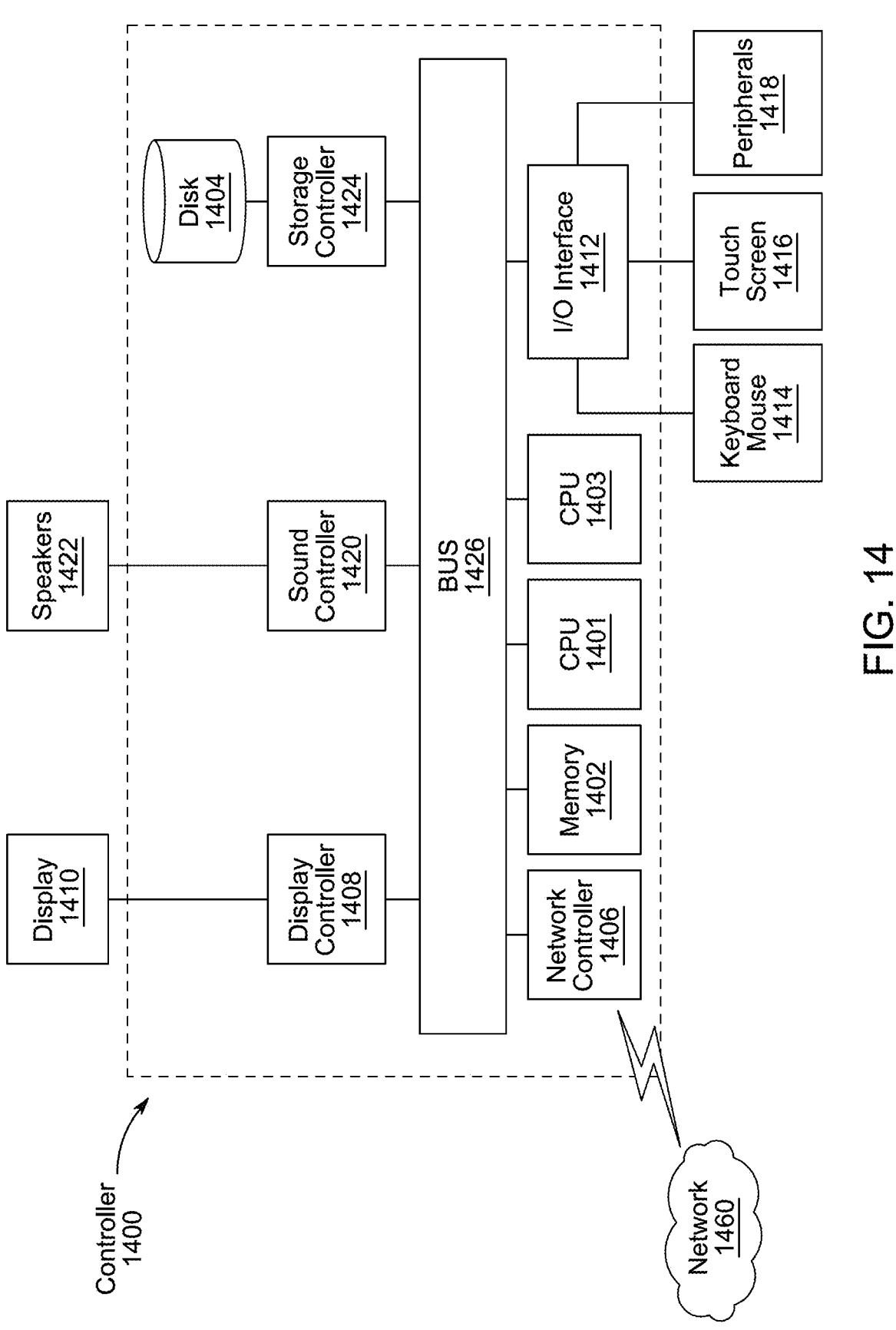
FIG. 14 is an illustration of a non-limiting example of details of computing hardware used in the computing system, according to certain embodiments.

Next, further details of the hardware description of the computing environment according to exemplary embodiments are described with reference to FIG. 14. In FIG. 14, a controller 1400 is described is representative of the system 100 of FIG. 1 in which the controller is a computing device which includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 1401, 1403 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 1408, such as a NVIDIA Geforce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known. The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
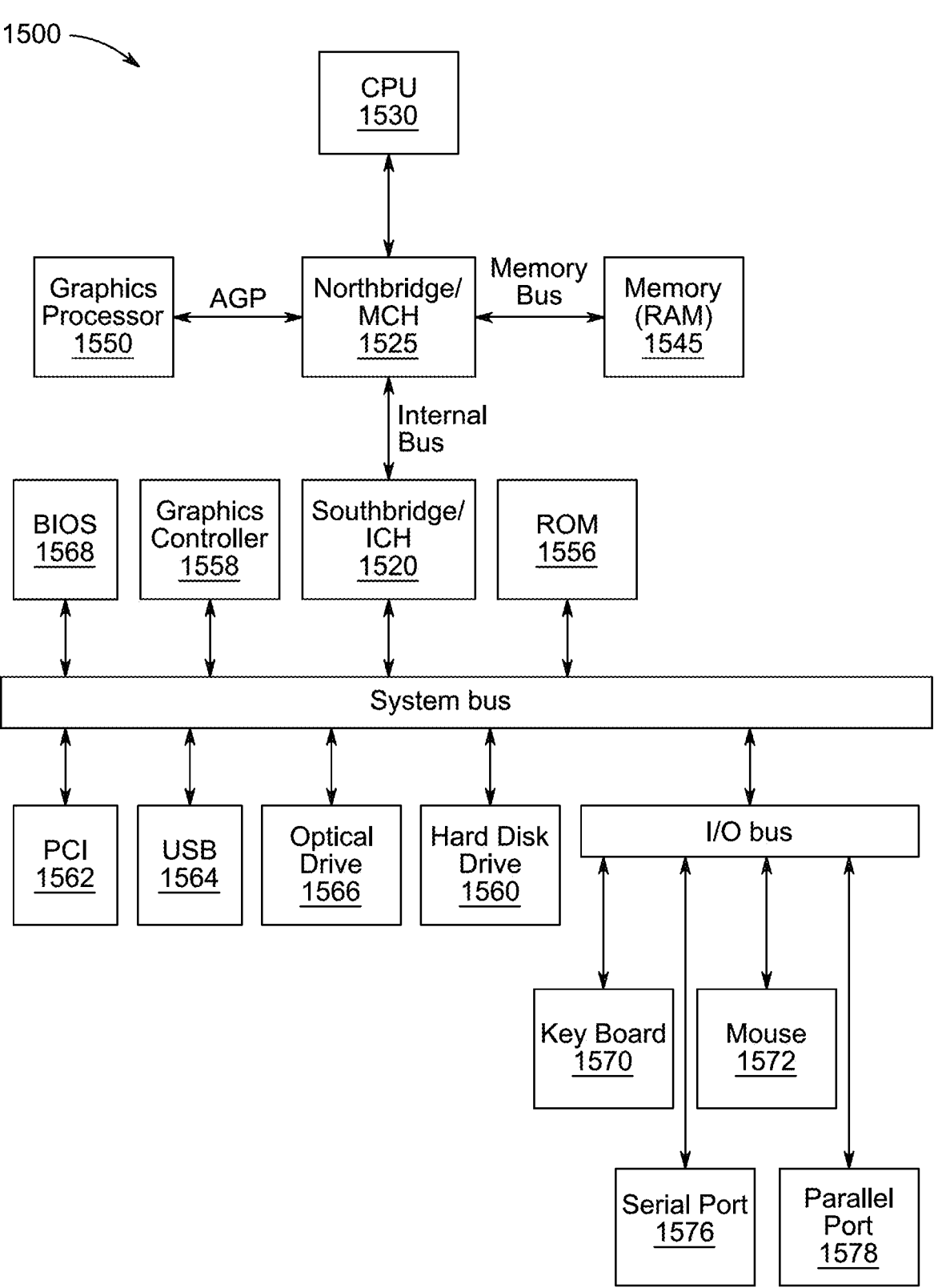
FIG. 15 is an exemplary schematic diagram of a data processing system used within the computing system, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
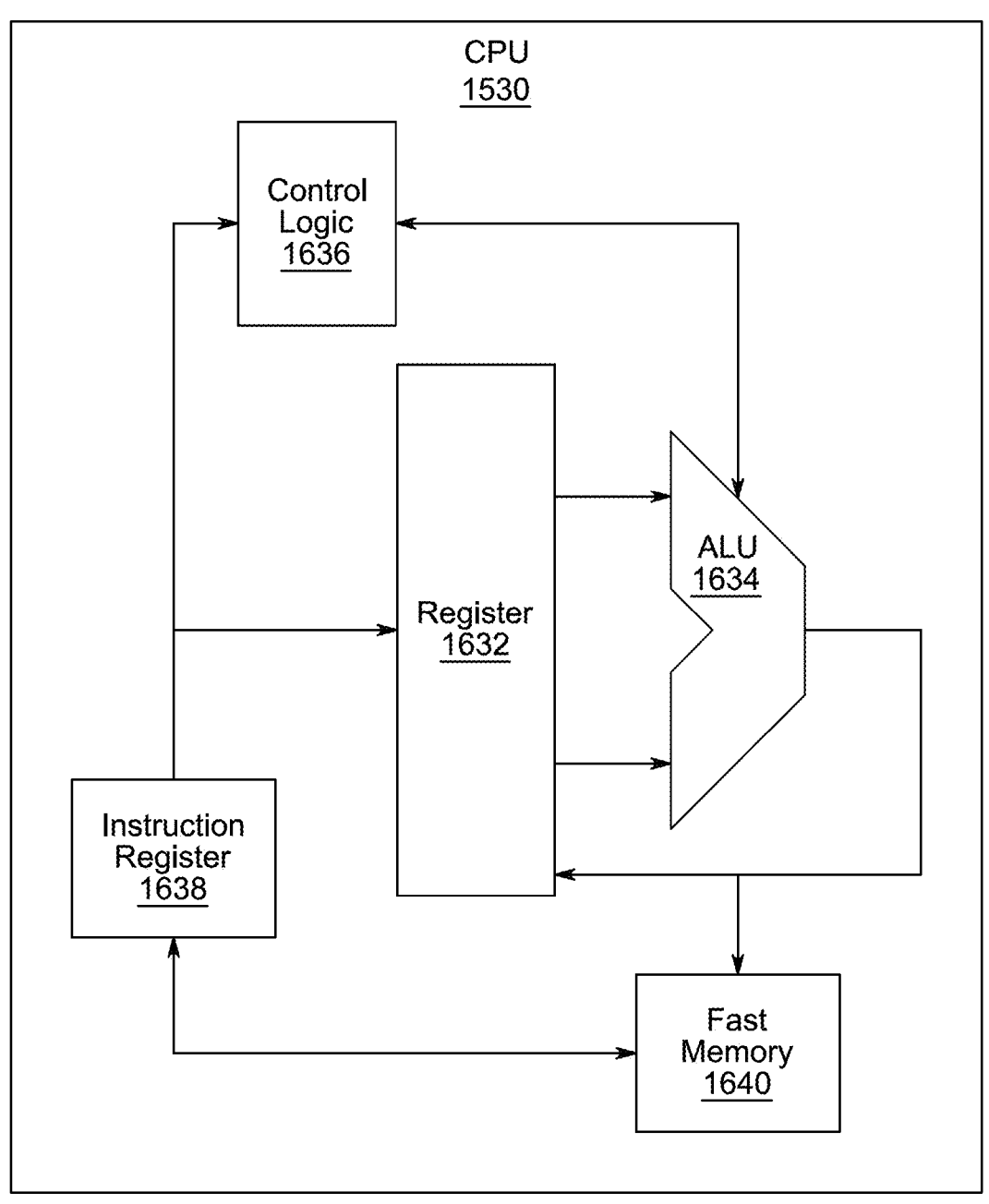
FIG. 16 is an exemplary schematic diagram of a processor used with the computing system, according to certain embodiments.

For example, FIG. 16 shows one implementation of CPU 1530. In one implementation, the instruction register 1638 retrieves instructions from the fast memory 1640. At least part of these instructions is fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562. The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 17:
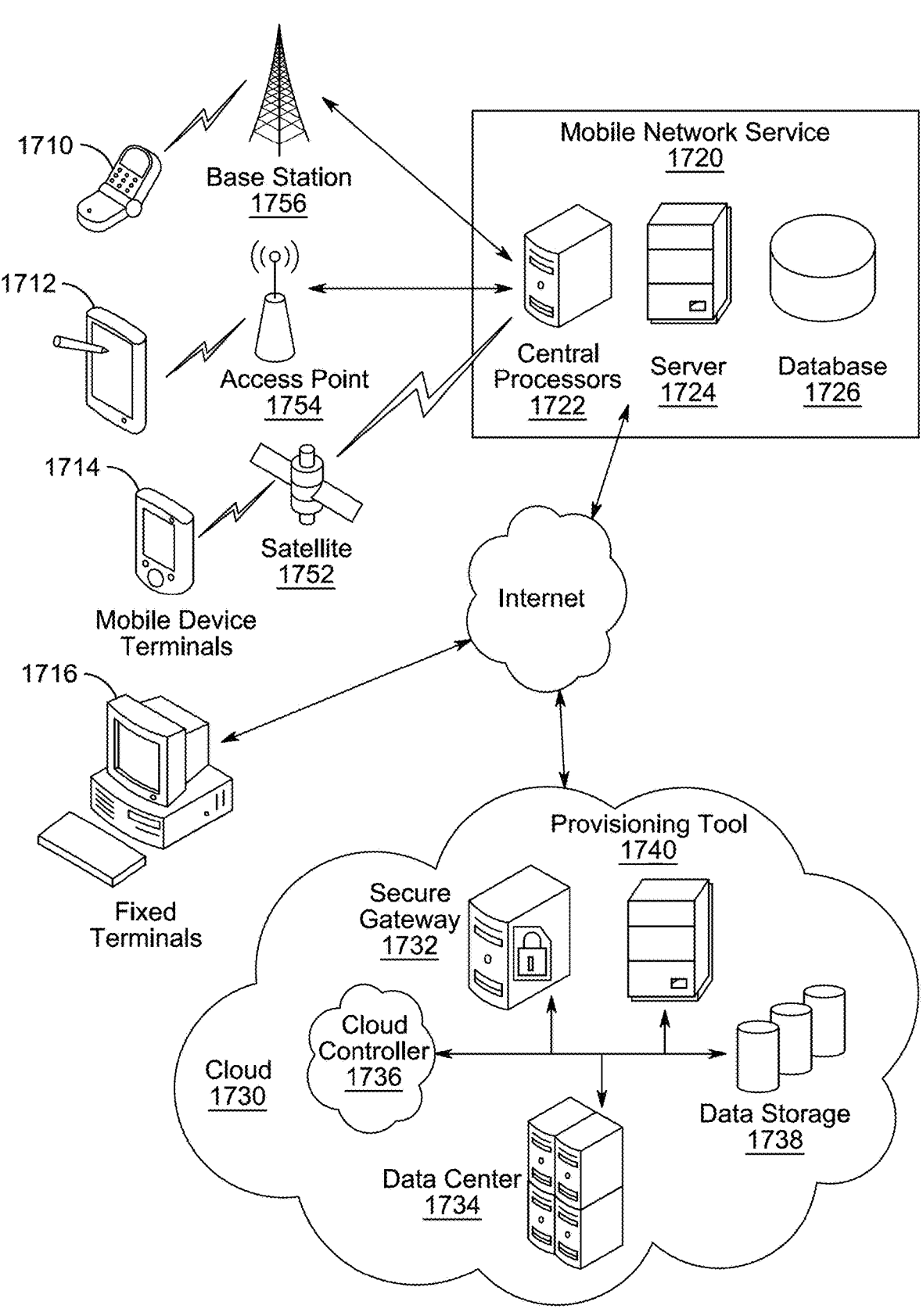
FIG. 17 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). More specifically, FIG. 17 illustrates client devices including a smart phone 1711, a tablet 1712, a mobile device terminal 1714 and fixed terminals 1716. These client devices may be commutatively coupled with a mobile network service 1720 via a base station 1756, an access point 1754, a satellite 1752 or via an internet connection. The mobile network service 1720 may comprise central processors 1722, a server 1724 and a database 1726. The fixed terminals 1716 and the mobile network service 1720 may be commutatively coupled via an internet connection to functions in cloud 1730 that may comprise a security gateway 1732, a data center 1734, a cloud controller 1736, a data storage 1738 and a provisioning tool 1740. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A device for mitigating red palm weevil infestations in a palm tree, comprising:
    a solar cell configured to generate electrical energy;
    a battery charger electrically connected to the solar cell;
    a battery electrically connected to the battery charger and configured to store said electrical energy;
    an ultrasonic wave generator electrically connected to the battery and configured to generate ultrasonic waves in a frequency range of 20 kHz to 100 kHz;
    a dimmer electrically connected to the ultrasonic wave generator and configured to modulate the frequency of the ultrasonic waves; and
    a dual-emitter configuration comprising:
        one or more internal emitters configured for insertion into a trunk of the palm tree, wherein each of the internal emitters comprises a rigid cylindrical probe having a longitudinal axis and a distal end housing an ultrasonic transducer, wherein the distal end is in a form of a cylinder having a length that is no more than 0.05 times the length of the rigid cylindrical probe, and a width that is at least 10 times the width of the rigid cylindrical probe;

at least one pair of external emitters configured to be positioned on an outside surface of the trunk of the palm tree, wherein each of the external emitters comprises a pair of directional ultrasonic transducers mounted on opposing sides of the trunk and housed within a flexible semicircular bracket adapted to hold each transducer of each pair of transducers directly opposite one another on the trunk and direct ultrasonic waves inwardly, wherein each of the internal emitters and the external emitters are electrically connected to the dimmer, configured to operate in coordination, and positioned relative to one another to direct ultrasonic waves toward overlapping regions of the palm tree, thereby promoting constructive interference; and a digital screen electrically connected to the battery and configured to display at least a frequency level and a battery percentage status.

2. The device of claim 1, wherein the dimmer is configured to modulate ultrasonic wave frequencies between 20 kHz and 40 kHz to disrupt insect movement.

3. The device of claim 1, wherein the dimmer is configured to modulate ultrasonic wave frequencies between 40 kHz and 100 kHz to disrupt insect communication and reproduction.

4. The device of claim 1, wherein the dual-emitter configuration is synchronized and positioned to produce constructive interference patterns within and around the palm tree, the emitters being located on opposite sides of a longitudinal axis of the trunk to direct ultrasonic waves toward one another.

5. The device of claim 1, wherein the one or more internal emitters include a barbed or helical anchoring feature to maintain insertion stability within the trunk.

6. The device of claim 1, wherein the internal emitters and the external emitters are configured such that ultrasonic waves constructively interfere at one or more convergence regions within the palm tree, irrespective of the direction of wave propagation, provided the waves are phase-aligned.

7. The device of claim 1, wherein the digital screen further comprises a touch interface for adjusting frequency output and timing.

8. The device of claim 1, wherein the battery is a rechargeable lithium-ion battery configured to operate the device for at least 12 continuous hours.

9. The device of claim 1, further comprising a weather-resistant housing enclosing the ultrasonic wave generator, dimmer, and digital screen.

10. The device of claim 1, wherein the solar cell has a conversion efficiency of at least 18 percent.

11. The device of claim 1, further comprising a control module configured to adjust frequency output based on time of day or ambient temperature.

12. The device of claim 1, further comprising a data logger configured to record ultrasonic frequency levels, time of operation, and battery performance.

13. The device of claim 1, wherein the internal emitters and the external emitters of the dual-emitter configuration are phase-locked to maximize ultrasonic intensity through constructive interference.

14. The device of claim 1, wherein the one or more external emitters are mounted in a plane substantially perpendicular to a longitudinal axis of the trunk.

15. A method for mitigating boring insect infestations in a plant structure, the method comprising:

generating ultrasonic waves at frequencies between 20 kHz and 100 kHz;

transmitting the ultrasonic waves through a dual-emitter configuration comprising:

one or more internal emitters positioned within a trunk of a plant or tree, wherein each of the internal emitters comprises a rigid cylindrical probe having a longitudinal axis and a distal end housing an ultrasonic transducer, wherein the distal end is in a form of a cylinder having a length that is no more than 0.05 times the length of the rigid cylindrical probe, and a width that is at least 10 times the width of the rigid cylindrical probe; and at least one pair of external emitters positioned on an outside surface of the plant structure, wherein each of the external emitters comprises a pair of directional ultrasonic transducers mounted on opposing sides of the plant structure and housed within a flexible semicircular bracket adapted to hold each transducer of each pair of transducers directly opposite one another on the plant structure and direct ultrasonic waves inwardly;

synchronizing the internal emitters and external emitters to generate constructive interference patterns; and disrupting insect behavior, including at least one of movement, orientation, communication, and reproduction.

16. The method of claim 15, wherein ultrasonic waves in a range of 20 kHz and 40 kHz disrupt insect movement and cause disorientation.

17. The method of claim 15, wherein ultrasonic waves in a range of 40 kHz and 100 kHz disrupt communication signals used for mating.

18. The method of claim 15, further comprising powering the dual-emitter configuration using energy stored in a battery charged by a solar cell.

19. The method of claim 15, wherein emissions are modulated using a dimmer to alternate between low and high frequency pulses.

20. The method of claim 15, further comprising recording frequency levels and operational time for performance tracking.

*   *   *   *   *